United States Patent [19]

Berry

[11] 4,261,379

[45] Apr. 14, 1981

[54] VIBRATION/TEMPERATURE SENSITIVE VALVE OPERATING APPARATUS

[76] Inventor: Edwin X. Berry, 6040 Verner Ave., Sacramento, Calif. 95841

[21] Appl. No.: 113,879

[22] Filed: Jan. 21, 1980

[51] Int. Cl.³ ............................................. F16K 17/36
[52] U.S. Cl. ..................................... 137/39; 251/66; 251/68
[58] Field of Search ................... 137/38, 39; 251/66, 251/68

[56] References Cited

U.S. PATENT DOCUMENTS

| | | | |
|---|---|---|---|
| 1,742,685 | 1/1930 | Brandon | 137/38 |
| 2,615,460 | 10/1952 | Crow | 137/38 |
| 3,791,396 | 2/1974 | Nelson | 137/38 |
| 4,007,643 | 2/1977 | Matsushita | 137/38 X |

*Primary Examiner*—Robert G. Nilson
*Attorney, Agent, or Firm*—Townsend and Townsend

[57] ABSTRACT

A valve shutoff mechanism for automatically operating a gas valve, a liquid valve or the like to shut off the flow of fluid in a pipeline in response to an earthquake, temperature changes and/or an electrical or mechanical signal generated by an associated mechanism. The housing, formed of complementary, symmetric half portions, encloses a spring bias motor, a torque arm assembly coupled to the spring motor for rotation about a first axis, a latch assembly for normally preventing rotation of the torque arm assembly, and a triggerable catch assembly for normally maintaining the latch assembly in contact with the torque arm assembly and for enabling the latch assembly to disengage the torque arm assembly in response to seismic vibrations of predetermined magnitude and acceleration, an externally generated electrical signal, temperature changes of predetermined magnitude or a combination thereof. The triggerable catch means includes a triggering device for releasing the latch assembly which in turn releases the torque arm assembly for rotation, the trigger device comprising a ball weight connected to or supported by the free end of the trigger arm, a compression spring bearing on the free end of the trigger arm, an electrically operable solenoid coupled to the trigger arm, a temperature sensitive switch element coupled to the trigger arm or combination thereof.

21 Claims, 12 Drawing Figures

VIBRATION/TEMPERATURE SENSITIVE VALVE OPERATING APPARATUS

BACKGROUND OF THE INVENTION

This invention relates to valve shutoff mechanisms for automatically operating a gas valve or the like to shut off the flow of fluid in a pipeline in response to an earthquake, temperature changes and/or an electrical or mechanical signal generated external to such mechanisms.

Vibration sensitive devices are known which are designed to respond to earthquake vibrations of a predetermined magnitude in order to shut off a valve in a gas conduit or the like. Such devices function as a safety mechanism for reducing the possibility of explosion due to ruptured gas connections downstream of the valve and within a building structure, such as a private dwelling, an apartment building, an office building or the like. In my previously filed and issued U.S. Pat. No. 4,161,183, issued July 17, 1979, the disclosure of which is hereby incorporated by reference, a vibration sensitive valve operating apparatus is disclosed and claimed which avoids disadvantages inherent in known earlier devices, and which can be tuned to vibrations of a predetermined magnitude so as to avoid false triggering of the device in response to seismic vibrations unrelated to earthquakes, such as vibrations caused by passing trucks or frictional forces resulting from mechanical loading. In addition my earlier invention is designed with a protective enclosure for the latch and trigger mechanisms to avoid accidental triggering by a prowling animal or small child. Further, my earlier invention is compatible with a wide variety of valve mechanisms, is capable of being installed without the requirement of special technical skills, and can be left in situ for long periods of time without suffering functional impairment due to exposure to the elements.

SUMMARY OF THE INVENTION

This invention comprises an improvement over my earlier invention and comprises a vibration sensitive valve operating apparatus which is completely enclosed and sealed prior to installation, can be reset externally by means of a simple tool, provides greater force multiplication between the trigger means and the valve operating torque arm, and is more compact and less expensive to manufacture.

The invention comprises a housing adapted to be secured to a fluid conduit having a valve installed therein, with the valve stem extending toward a torque axle on a common first axis and coupled to a torque axle by a coupling means. A dual torque arm is secured to the torque axle and is engaged with first and second bearings of a force axle. The force axle has an axis parallel to the axis of the torque axle and rides upon a spring motor axle which extends along the housing in a direction perpendicular to the torque axle. The force axle is engaged by a force engaging means to the spring motor means, which comprises a linear compression spring having an axis common to the spring axle. The dual torque arm is engaged at its free ends with the first and third bearings of a latch assembly pivotally mounted for rotation about a second axis parallel to the first axis. The latch assembly has a second bearing intermediate the first and third bearings which is engaged with a triggerable catch assembly. The triggerable catch assembly includes a trigger arm which is pivotally mounted for rotation about a third axis and which terminates in a ball weight seat portion.

The latch assembly comprises a pair of laterally spaced arm members pivotally mounted adjacent one end thereof along the second axis (parallel to the rotational axis of the torque axle), and is provided with the first, second and third bearing members noted supra which are freely rotatable mounted adjacent to the other end of the arm members about an axis parallel to the pivotal axis of the arm members. The first and third bearing members have a bearing surface normally engaged with the free ends of the dual torque arm, while the second bearing member has a bearing surface normally engaged with an intermediate portion of the trigger arm.

The trigger arm is pivotally mounted about the third axis (parallel to the first and second axis) and is provided with the intermediate portion, which is preferably notched with a slight positive radius to facilitate the triggering operation described below. The ball weight seat portion is provided with a surface depression for receiving a ball weight therein when the mechanism is armed. The depression preferably comprises a partial conic section of predetermined apex angle and radius, or optionally a combination of concentric conic sections.

The total actuator assembly, including the ball weight, is enclosed within the housing, which preferably comprises two identical symmetric half portions. Internal facing wall portions formed within each half portion define a chamber for containing the ball weight when the two half portions are assembled, the chamber having a floor portion with an aperture therein to permit the ball weight seat portion to enter the chamber from below and hold the ball weight in an elevated position above the floor portion when the device is armed. The chamber floor portion slopes downwardly toward the aperture to promote migration of the ball weight, when dislodged, toward the aperture to facilitate external resetting of the device once triggered. The housing is thus constructed such that there is no need to open or enter the housing to trigger or to reset the actuator.

The device is mounted to the associated external valve by means of a mounting bracket secured to the valve housing and to the device housing. The torque axle, which has opposite ends extending to the exterior of the device housing, is attached at one end to the valve stem by a suitable coupling means.

To install the device to a fluid pipe arrangement, the actuator-valve assembly may be attached to the pipe as a single unit or, alternatively, the valve may first be installed in the fluid pipe and then the actuator secured to the valve by means of the mounting bracket and coupling means. Proper orientation of the device is provided as follows.

The valve axis is first rotated about the pipe axis until the valve axis lies in a horizontal plane. The device housing is then rotated about the torque axle until the top edge of the device housing is substantially horizontal. All mechanism axes thus lie in parallel horizontal planes. To facilitate orientation of the device housing, a leveling device is secured to the top surface of the device housing. The coupling means is next affixed in such a manner that the valve is in the desired position, usually the closed position, when the actuator is in the triggered state. The actuator is then secured to the mounting bracket and the device is ready to be armed.

The mechanism is armed in the following fashion. The torque axle is forceably rotated in a direction counter to the normal direction of rotation thereof when the device is triggered, by using a suitable tool such as a socket wrench. This counter rotation is continued until the torque axle has reached a position slightly in excess of 90° in the preferred embodiment, and the torque axle is held momentarily in this angular position. This rotation causes the external valve means to achieve either the open or the closed position, depending upon the attachment of the coupling between the valve stem and the torque axle, by virtue of the coupling between the valve stem and the torque axle. As the torque axle is maintained momentarily in the over center position, the latch and the trigger arm fall beyond their normally armed positions. The ball weight seat portion of the trigger arm is thereby lowered beyond its normally armed position, which allows the ball weight to roll down the sloped internal floor of the housing and into the depression in the ball weight seat portion. The weight of the ball is sufficient hold the trigger arm in engagement with the second latch bearing, which in turn maintains the first and third latch bearings in engagement with the dual torque arm as the torque axle is slowly manually released a few degrees to the approximately 90° position. The socket wrench, or other tool, is then removed.

Once armed, the invention is triggered in the following manner. The occurrence of an earthquake type seismic motion of predetermined magnitude and acceleration sufficient to cause serious damage to the associated structure causes the ball weight to be forced from the depression in the ball weight seat portion and onto the internal floor of the housing in the case of horizontal earth motions. In the case of vertical earth motion of sufficient magnitude and acceleration the downward component of motion will remove a portion of the downward force of the ball weight on the ball weight seat such that triggering will occur. The trigger arm is released and is driven upwardly by a component of force from the latch. This action frees the latch assembly to pivot about its axis in response to the force applied to the first and second bearing surfaces by the spring motor means throught the dual torque arm. When the latch assembly has pivoted a sufficient angular distance, which is very small, to clear the first and third bearing surfaces from the ends of the dual torque arm, the spring motor means rotates the dual torque arm and torque axle approximately 90° to close the valve (if the valve was initially open), or to open the valve (if the valve was initially closed). Once tripped, the invention may be rearmed in the manner noted above.

In an alternate embodiment of the invention, a solenoid and operating linkage are coupled between the housing and the trigger arm to provide a triggering action in response to an electrical actuation signal from a condition responsive device, such as a smoke alarm, a gas flow rate indicator, or the like.

In a second alternate embodiment of the invention, a bimetallic spring, or other mechanical device that moves in response to temperature changes, is coupled between the housing and the trigger arm to provide a triggering action in response to a preset temperature.

In a third alternate embodiment of the invention, the ball weight may be affixed to the ball weight seat. This eliminates the sensitivity of the device to horizontal vibrations and removes the sensitivity to small angles of tilt but otherwise allows the device to operate as described.

In a fourth alternate embodiment of the invention, the ball weight is replaced by a spring, such as a compression spring, extending between the ball weight seat and the internal top wall of the housing. This eliminates the sensitivity of the device to both horizontal and moderate vertical vibrations and to tilt, but otherwise allows the device to operate as described.

In order to prevent excess mechanical wear to the spring loaded components of the assembly, a shock absorber is mounted on the spring axle in such a position as to be engaged by the forward portion of the force axle once the torque arm has been rotated the requisite angular distance. Similarly, a second shock absorbing device is mounted transversely of the housing in such a position as to be engaged by the dual torque arm, once rotated.

The invention is capable of providing a mechanical advantage in excess of 1000 to 1 between the ball weight and the dual torque arm, and the torque applied to the torque axle, and thus to the external valve, is tailored to the torque requirements of the valve by means of the particular mechanical arrangement employed, which is sometimes known as a "scotch yoke" linkage. With respect to the vibration sensitivity, the invention can be triggered by a combination of vertical and horizontal seismic motions, and also by purely vertical seismic motion of such a magnitude that the downward acceleration due thereto reduces the force of the ball weight on the ball weight seat portion of the trigger arm by a sufficient amount to allow the trigger arm to rise and release the latch.

An optional electrical switch is secured to the housing in a position in which the switch blades are mechanically actuated in response to motion of the torque arm (or valve stem) after triggering. The switch is coupled to an electrically operated warning indicator, or to an electrically activated condition response device, in order to supply an electrical signal indicating that the triggering has occurred.

For a fuller understanding of the nature and advantages of the invention, reference should be had to the ensuing detailed description taken in conjunction with the accompanying drawings.

DESCRIPTION OF THE PREFERRED EMBODIMENT

Figure 1:
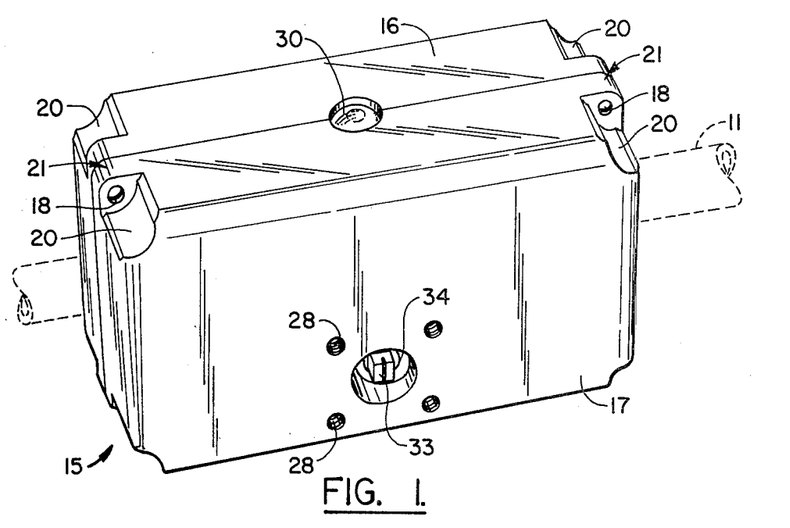
FIG. 1 is a perspective view showing the preferred embodiment of the invention.
Figure 2:
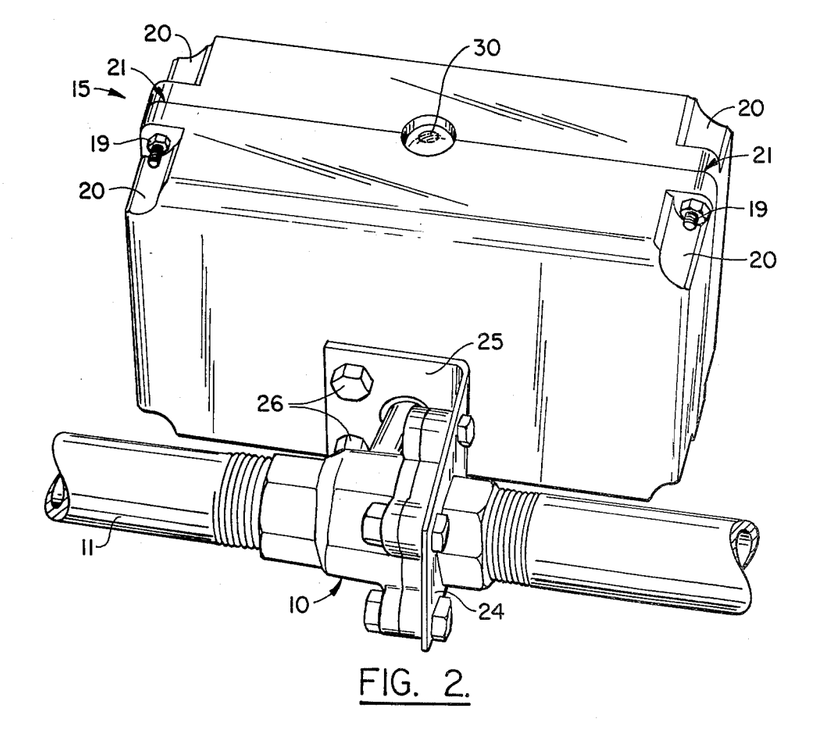
FIG. 2 is a perspective view taken from the rear of FIG. 1.

Turning now to the drawings, FIGS. 1 and 2 are perspective views illustrating the preferred embodiment of the invention connected to a gas valve generally designated by numeral 10 installed in a gas conduit 11. Gas valve 10 may comprise any one of a number of suitable valve, such as a "Jamesbury Clincher" valve available from Jamesbury Valve Company of Worcester, Massachusettes. The preferred embodiment includes a housing generally designated by reference numeral 15 and comprising two symmetric identical half portions 16, 17 secured together by suitable fastenings, such as bolts 18 and nuts 19, as depicted or by rivets. Alternately the two halves of the housing may be glued or bonded together. Housing 15 is provided with relieved shoulder portions 20 along the edges thereof so that symmetric half portions 16, 17, when joined, form corner flanges 21 of reduced width to facilitate fastening the two half portions 16, 17 together.

The housing 15 is secured to the valve housing 10 by means of a generally L shaped bracket 24 having enlarged apertures formed in leg 25 for receiving bolts 26 used to fasten the bracket 24 to one side of the housing 15 by means of threaded bores 28 (see FIG. 1). A bubble leveling device 30 is provided in the top wall of housing 15 to facilitate installation of the device in the manner described below. Housing 15 (i.e., symmetric, identical half portions 16, 17) may be fabricated of a suitable metal, such as aluminum, by machining or from a high impact plastic material by molding.

Figure 3:
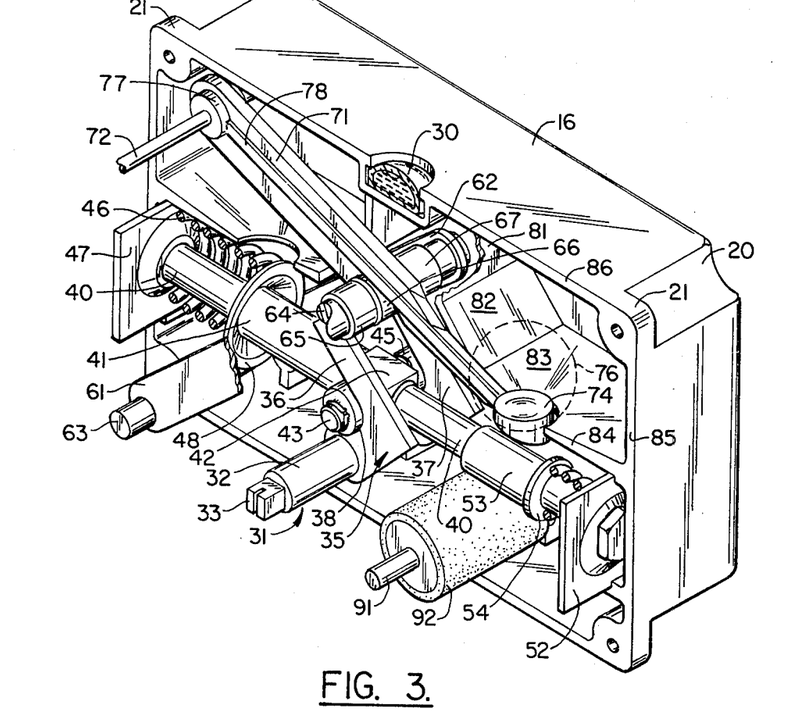
FIG. 3 is a cutaway view showing the operative elements of the preferred embodiment.
Figure 4A:
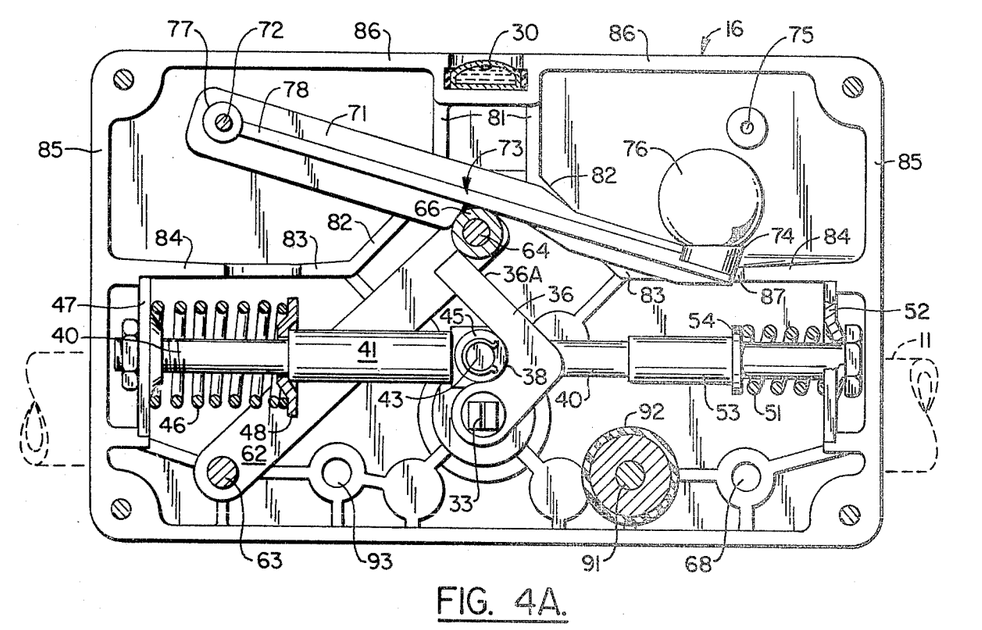
FIG. 4A is a sectional view illustrating the invention in the fully armed state.
Figure 4B:
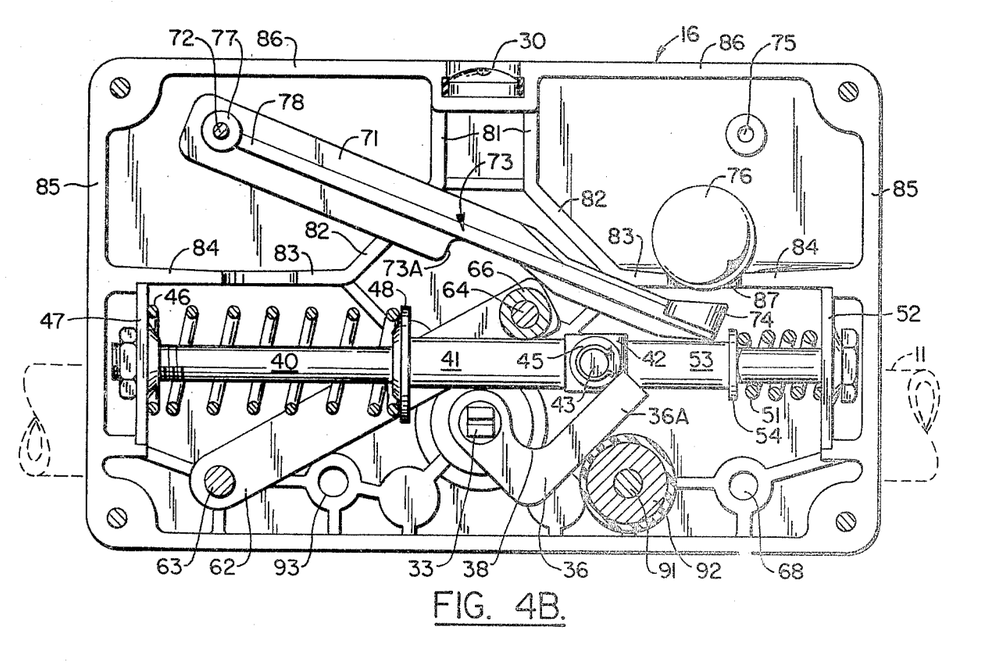
FIG. 4B is a view similar to FIG. 4A showing the invention after triggering.
Figure 5:
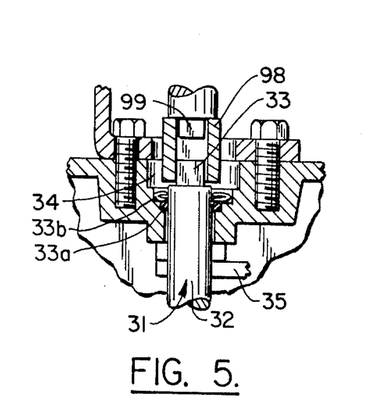
FIGS. 5 and 6 are detail views illustrating elements of the invention.

With reference to FIGS. 3, 4A and 4B, the components of the invention, which are entirely enclosed within housing 15 (with the exception of the ends of the torque axle) include a torque axle 31 symmetrically formed with respect to its longitudinal axis and having a cylindrical main body section 32 terminating at either extremity in a square end 33. The portion of main body portion 32 adjacent the square end 33 provides a rotatable bearing surface in conjunction with a mating aperture 34 (see FIG. 1) formed in each half of the housing 15, and each end 33 extends to the exterior of the housing 15 (the only element to do so). As shown in FIG. 5, which is a partial sectional view of the valve end of axle 31, and O-ring seal 33a and an expansion ring 33b are disposed about the outer end of portion 32 within aperture 34 to provide a fluid seal for preventing ingress of contaminant materials to the interior of housing 15. Centrally mounted by press fitting onto main body portion 32 of torque axle 31 is a double torque arm 35 comprising a pair of individual bent arms 36, 37, each having a curved inner radius surface 38. Arms 36, 37 are thus arranged for rotation with torque axle 31.

Figure 6:
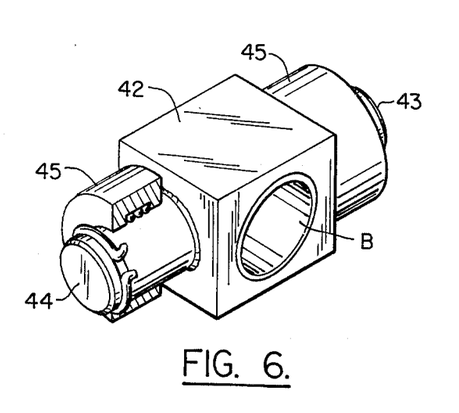

Extending longitudinally of housing 15 is a single shaft 40 for carrying several of the operative elements of the device. Slidably received on shaft 40 is a force translating mechanism comprising a cylindrical sleeve 41, to the forward or driving end of which is mounted a force block 42 illustrated in partial cutaway perspective in FIG. 6 and having a pair of laterally spaced stub axles 43, 44 forming a force axle extending generally parallel with the axis of the torque axle 31. Mounted on each of the stub axles 43, 44 is a bearing 45 which contacts the associated arm 36, 37. Force block 42 is preferably provided with a bearing sleeve B to promote sliding of the block 42 along shaft 40.

Mounted about shaft 40 adjacent the driven end of sleeve 41 is a spring motor comprising a compression spring 46 and a pair of spring keepers 47, 48. Spring keeper 47 is engaged between the stationary end of spring 46 and a suitable fixture such as a locking nut at the end of shaft 40. Keeper 48 is coupled between the moveable end of spring 46 and the driven end of sleeve 41.

At the opposite end of shaft 40, a shock absorber comprising a helical spring 51, a spring keeper 52 and a cylindrical sleeve 53 having a flanged portion 54. The shock absorbing mechanism comprising elements 51-54 serves to decelerate the force translating mechamism comprising elements 41-44 to restrict the axial travel thereof along shaft 40 and also functions to absorb the shock of impact thereof during triggering of the device.

Spring keeper 52 is contained on shaft 40 by a bolt head, or other suitable fixture. The assembly on shaft 40 is completely contained by keepers 47 and 52 and the associated end fixtures on shaft 40. Thus, when the spring motor force is released the excess impact is caught by shaft 40 and not transmitted directly to the ends of housing 15. The assembly on shaft 40 is preassembled and set into the housing 15 as a unit. The assembly rests in housing 15 with the only contact being that of the outside edges of keepers 47 and 52 with the straight grooves formed inside the housing halves 16 and 17. The widely spaced ends of keeper 47 also serve to transmit the loaded force of spring motor 46 to the sides of housing 15 where such force is more easily handled by housing 15.

Figure 7:
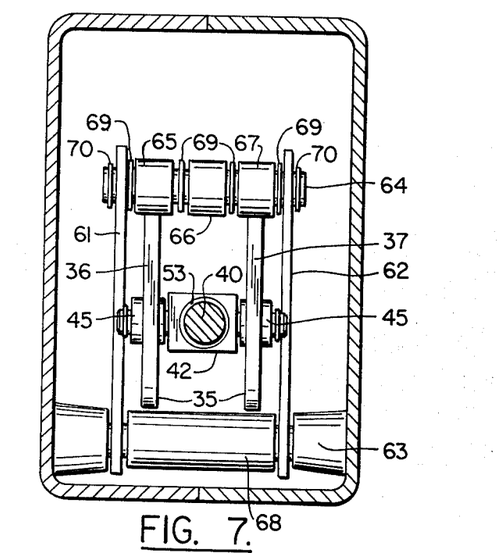
FIG. 7 is an end view of the latch assembly of the invention.

A latch assembly for normally maintaining torque arms 36, 37 in the cocked or armed position illustrated in FIGS. 3, 4A and 7 include a pair of arm members 61, 62 mounted for pivotal rotation about a shaft 63 defining a second axis parallel to the axis of torque axle 31, and a bearing shaft 64 having three bearing elements 65-67 mounted thereon. Shaft 63 is received at each end in a recess formed in a reinforced portion of each casing half 16, 17, such as the unused recess 68 shown in half portion 16 (it being remembered that half portions 16, 17 are symmetric and identical in shape both internally and externally). A spacer sleeve 68 is received on the central portion of shaft 63 to maintain the desired spacing between the lower ends of arm members 61, 62. A plurality of spacer washers 69 are arranged on bearing shaft 64 as shown in FIG. 7, the washers 69 being fabricated from Teflon or some other low friction material. Clip rings 70 are provided on opposite ends of shaft 64.

The latch assembly comprising elements 61-69 serves to maintain the torque arms 36, 37 in the armed position illustrated in cooperation with the triggerable catch assembly to be described.

The triggerable catch assembly includes a trigger arm 71 mounted for rotation about a third axis on a shaft 72, an intermediate notched portion generally designated by reference numeral 73, and a ball weight seat portion 74 secured to the free end of arm 71. Shaft 72 is received in a recess formed in each housing half portion 16, 17, such as unused recess 75 shown in FIGS. 4A and 4B. Intermediate notch portion 73 includes an abutting edge 73A (see FIG. 4B) having a slight curvature as shown for normally engaging the outer surface of bearing 66 carried by mounting shaft 64 of the latch assembly when the device is armed as depicted.

Ball weight seat portion 74 has a concave recess for receiving a ball weight 76 when the device is armed. The contour of the recess is preferably formed in the manner disclosed in my above referenced U.S. patent in order to enable the response of the mechanism to be tailored to a predetermined seismic threshhold.

Each casing half portions 16, 17 is provided with inwardly extending wall portions 81-86 to form an enclosed chamber for ball weight 76 when the device is assembled in the manner described below. Portions 83, 84 form a sloping floor portion which promotes migration of ball weight 76 towards an aperture 87 formed in the floor after the device has been triggered. In addition, wall portions 81-83 are relieved in order to enable unobstructed pivotal motion of trigger arm 71. In addition, aperture 87 is sufficiently large to permit entry of ball weight seat portion 74 into the ball weight chamber to the position illustrated in FIGS. 3 and 4A in which ball weight 76 is elevated slightly from the floor of the ball weight chamber when the device is armed.

A second shock absorbing mechanism comprising a shaft 91 and a resilient cylinder 92 mounted on shaft 91 provides a limit stop for double torque arms 36, 37 to prevent over travel. Shaft 91 is mounted in recesses formed in the casing half portions 16, 17 such as unused recess 93.

The device is assembled in the following fashion. Torque arms 36, 37 are fitted onto torque axle shaft 31, and this subassembly is installed in one casing half portion by passing one free end 33 of torque axle 31 through a corresponding housing aperture 34 until the outer edge of main body portion 32 is received within the aperture 34. The components are next assembled on shaft 40 and installed between the ends of the housing half portion, with the central portion of the shaft 40 subassembly received between the laterally spaced arms 36, 37. Shaft 64 is provided with bearings 65–67 and spacer washers 69, and is rotatably secured to the free ends of latch assembly arms 61, 62 by means of clips 70, after which arm 62 is manuvered past the shaft 40 subassembly, and shaft 63 is installed through the pivoting apertures in arms 61, 62, with spacer sleeve 68 in place. The trigger arm/assembly is next installed in the casing half portion by manuvering the appropriate end of shaft 72 into the corresponding recess 75, and ball weight 76 is placed within the chamber. The shock absorber comprising elements 91, 92 is then installed in the casing half portion by manuvering the appropriate end of shaft 91 into the corresponding recess 93. Lastly, the remaining casing half portion is fitted onto the free ends of shafts 31, 63, 72 and 91, after which the casing halves are firmly secured together by bolts 18 and nuts 19 or alternatively by rivets or bonding. The device is now assembled in the unarmed state with the elements configured as shown in FIG. 4B.

The assembled device is next coupled to the associated valve 10 using bracket 24 and bolts 26, as well as a suitable coupling means (such as coupler 98 shown in FIG. 5) between the square end 33 of the axle shaft 31 and the valve stem 99. Care must be taken in installing the device that the shaft 40 is substantially horizontal and the sight level 30 is useful for this purpose. If desired, of course, the device may be constructed without the sight level 30 incorporated therein, and a portable leveling device may be used. In practice, it has been observed that in most installations pipe 11 is either horizontal or only slightly angled with respect to horizontal. In such cases, the slightly oversized apertures provided in bracket 24 afford sufficient adjustment for the housing 15 horizontal attitude to enable the device to be properly installed. For those installations in which the oversized apertures do not provide sufficient angular adjustment, it is only necessary to form one or more additional apertures in bracket 24 (e.g., by drilling) at different angular positions. Alternatively, a different bracket design may be employed, if desired, having an angular rotational capability, as will be apparent to those skilled in the art.

With the device now installed and ready for use, the mechanism is armed in the following fashion. A suitable tool, such as a socket wrench, is fitted over the exposed square end 33 of axle 31 (FIG. 1) and the torque axle 31 is rotated counterclockwise (as depicted) by slightly more than 90°. As the axle 31 rotates, torque arms 36, 37 acting on the force block stub axles 43, 44 through bearings 45 cause the spring 46 to be compressed. In addition, torque arms 36, 37 initially contact bearing elements 65, 67 of the latch assembly causing this assembly to pivot in the counterclockwise direction. As the latch assembly pivots, the trigger arm 71 is raised by virtue of contact between bearing 66 and the intermediate notch portion 73, thus raising the ball weight 76 to an over center position. When torque arms 36, 37 reach the over center position, bearing elements 65, 67 of the latch assembly are free to descend along back edge 36A of torque arm 36 (and a corresponding back edge of torque arm 37). This position can be detected by an audible click of the ball weight 76 against the floor of the ball weight chamber as the seat portion 74 descends under the force of gravity and the ball weight 76. Thereafter, the manual force applied to torque axle 31 is gradually and gently released to permit spring 46 to translate force block 42 to the right in FIGS. 4A and 4B, thereby causing torque arms 36, 37 to rotate a few degrees clockwise until the design equilibrium point depicted in FIG. 4A is reached. The wrench is then removed from axle end 33, and the device is now armed and ready to be triggered.

In response to receipt of seismic motion of predetermined magnitude and acceleration, ball weight 76 will be dislodged from ball weight seat portion 74, thus permitting trigger arm 71 to be pivoted in the counterclockwise direction by the force applied thereto from spring 46 via force block 42, stub axles 43, 44, bearings 45, torque arms 36, 37, and bearing elements 65–67. Once trigger arm 71 has been elevated by a predetermined amount, bearing element 66 is no longer restrained by the notch portion 73 of trigger arm 71, and the latch assembly pivots in the counterclockwise direction, thus freeing the torque arms 36, 37 for angular rotation in the clockwise direction. As a result, torque axle 31 is similarly rotated in the clockwise direction to cause valve 10 to be operated. After traveling the requisite angular amount, torque arms 36, 37 are restrained against further motion by resilient element 92. In order to reduce the shock produced on the shaft 40, and to prevent over travel of the force block 42 beyond the extreme-most retractable position, the shock absorber consisting of elements 51–54 restrains further translation of force block 42. Once triggered, the device may be rearmed in the manner noted above.

In addition to the advantages noted in my U.S. Pat. No. 4,161,183, the instant invention possess several additional advantages. Firstly, the entire mechanism is enclosed and sealed, so that environmental contaminants have no effect on the proper operation of the device. In addition, the instant invention may be reset in a very simple fashion by using a common tool. In this connection, the sloping chamber walls 82–84 insure that ball weight 76 will invariably return to the aperture 77 in a position in which it may again be raised by the ball weight seat portion 74 of trigger arm 71. In addition, due to the extremely simple construction of the device, it is fail safe even over prolonged periods of time when installed in situ or simply left unattended. Further, the utilization of completely symmetric and identical casing half portions reduces the manufacturing cost for the device by requiring only a single mold or die to produce the entire housing. Moreover, the use of the "scotch yoke" mechanism, and the proper dimensioning of the latch assembly, the spring motor mechanism and the trigger arm assembly, provided a much higher mechanical advantage (on the order of 1000 to 1) than previous devices of this type. Thus, the invention can be employed with a wide variety of different types of valve mechanisms having a wide dynamic torque range.

Figure 8:
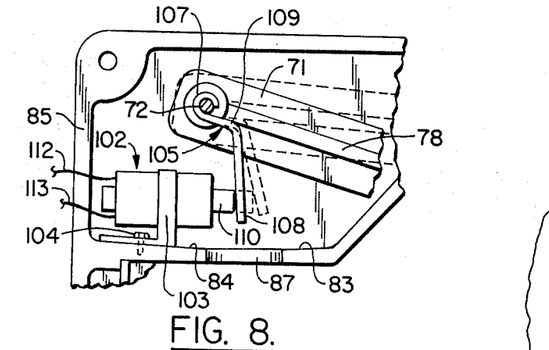
FIGS. 8–11 are partial detail views illustrating alternate modifications of the invention.

FIG. 8 illustrates a first modification of the invention which permits actuation of the device in response to an electrical control signal, such as a warning signal from a smoke detector or a flow rate meter. As seen in this Figure, an electrically actuatable solenoid 102 is secured to wall portion 84 of housing 15 by means of a bracket 103 and a fastener 104. A link element 105 having a curved extremity 107 received about a hub portion 77 of trigger arm 71 is mounted as shown, and is provided with a driven end 108 disposed adjacent the working end of solenoid plunger 110. A central portion 109 of link element 105 contacts the underside of rib 78 of trigger arm 71. A pair of electrically conductive leads 112, 113 extend to the exterior of housing 15 to enable solenoid 102 to be electrically coupled to the signal source.

In operation, when solenoid 102 is actuated by the control signal, plunger 110 is translated to the right as viewed in FIG. 8. Link element 105 is consequently rotated in the counterclockwise direction, and trigger arm 71 follows this motion. The rotation of trigger arm 71 releases the latch assembly, and the remainder of the operation is as described above.

Figure 9:
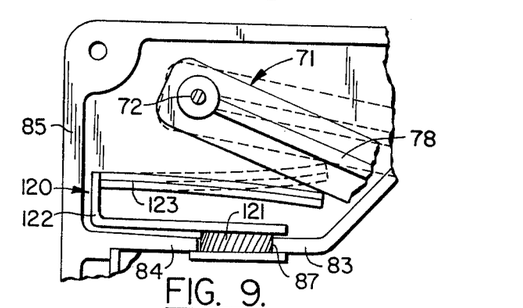

FIG. 9 illustrates a second modification of the invention which provides actuation of the device in response to temperature changes of undesired magnitude, e.g., in case of fire at the location of the device or lowering of ambient temperature to a degree close to the freezing point of a liquid (such as water in pipe 11). As seen in this FIG., a bi-metal temperature switch 120 comprising a pedestal portion 121 received in aperture 87, a J-shaped support member 122 and a bi-metal arm 123 is mounted within housing 15, with the free end of arm 123 adjacent the underside of trigger arm 71. Bi-metal arm 123 is a known structure which responds to changes in ambient temperature by a combination of contraction and expansion resulting in displacement of the free end as depicted in phantom, which lifts trigger arm 71 a sufficient distance to release the latch assembly and trigger the device.

Figure 10:
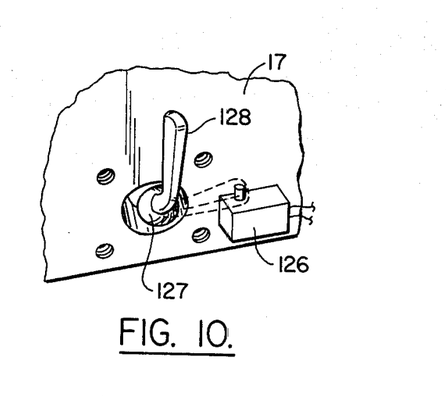

With reference to FIG. 10, if desired a microswitch 126 may be mounted as shown to provide a condition indicating signal specifying whether the device is in the armed or triggered state. As adapter 127 having an operating link 128 is arranged on end 33 of the torque axle 31. When the device is triggered, link 128 is rotated approximately 90° in the clockwise direction and mechanically actuates the microswitch 126. This signal may be used to operate an indicator, e.g., a lamp, or as a process control to stop a conveyor belt, turn on a sprinkler system or the like.

Figure 11:
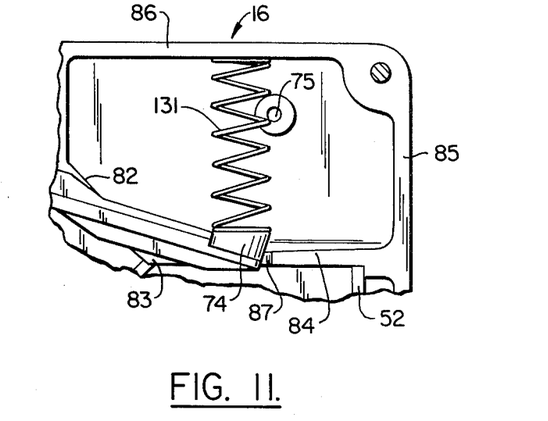

FIG. 11 illustrates another alternate embodiment of the invention, in which ball weight 76 is replaced by a compression spring 131 mounted between ball weight seat 74 and the inner surface of top wall portion 86. In this embodiment, sensitivity of the device to horizontal vibrations and tilting motion is eliminated: the device will, however, be triggered by vertical vibrations at or above a threshold which can be selected by chosing a spring 131 having a proper length and spring constant. Thus, this embodiment is useful for applications in which only vertical sensitivity is required or permitted. As will be apparent to those skilled in the art, a similar result to that obtained in the FIG. 11 embodiment, can be obtained by securing ball weight 76 permanently to ball weight seat 74.

When the above provides a full and complete disclosure of the preferred embodiment of the invention, various modifications, alternate constructions and equivalents may be employed without departing from the true spirit and scope of the invention. For example, the shock absorber comprising elements 53–55 may be replaced by an absorber similar to element 92. In addition, other types of auxiliary trigger arm actuation mechanisms than those depicted in FIGS. 8, 9 and 11 may be employed. Therefore, the above description and illustrations should not be construed as limiting the scope of the invention which is defined by the appended claims.

What is claimed is:

1. A valve shut-off device for operating an associated valve means in response to seismic vibrations of predetermined magnitude, said valve means having an externally operable movable valve mechanism, said device comprising:

a housing providing an enclosure, said housing including an opposed pair of end wall members;

spring bias means received within said housing;

torque arm means adapted to be coupled to said movable valve mechanism and having an intermediate portion coupled to said spring bias means and a free end;

said spring bias means providing a biassing force tending to rotate said torque arm means about a predetermined first axis in a predetermined angular direction;

latch means for normally preventing rotation of said torque arm means in said predetermined angular direction, said latch means being pivotally mounted to said housing for rotation about a second axis substantially parallel to said first axis and including first bearing means normally engaged with said free end of said torque arm means when said device is armed, and second bearing means; and triggerable catch means for normally maintaining said latch means in contact with said torque arm means and for enabling said latch means to disengage said torque arm means in response to said seismic vibrations, said triggerable catch means including trigger arm means pivotally mounted to said housing for rotation about a third axis substantially parallel to said second axis, said trigger arm means having an intermediate portion normally engaged with said second bearing means when said device is armed, and trigger means for enabling said trigger arm means to rotate about said third axis to disengage said intermediate portion of said trigger arm means from said second bearing means in response to said seismic vibrations so that said latch means disengages said torque arm means to enable said spring bias means to rotate said torque arm means in said predetermined angular direction.

2. The combination of claim 1 wherein said spring bias means includes a shaft extending longitudinally of said housing, and a compression spring received on said shaft, said spring being compressed when said device is armed.

3. The combination of claim 2 wherein said spring bias means further includes a force translating member slidably received on said shaft and having first and second end portions coupled respectively to one end of said spring and said intermediate portion of said torque arm means.

4. The combination of claim 2 wherein said spring bias means includes keeper means coupled between said shaft and said housing for transmitting force generated by said spring bias means to said housing.

5. The combination of claim 3 wherein said torque arm means comprises first and second curved arm members each having a free end and an intermediate portion, said arm members being spaced along said first axis and symmetrically disposed with respect thereto; said latch means includes third bearing means, said first and third bearing means being normally engaged with said free end of said first and second curved arm members, respectively, when said device is armed; and said force translating member comprises fourth and fifth bearing means transversely arranged along said shaft and normally contacting said intermediate portion of said first and second curved arm members, respectively, when said device is armed.

6. The combination of claim 3 wherein said spring is mounted adjacent a first one of said end wall members, and wherein said device further includes shock absorber means mounted adjacent the other one of said end wall members of said housing for engagement with said force translating member after said device has been triggered and said torque arm means has been rotated about said first axis by a first angular amount.

7. The combination of claim 1 wherein said housing includes limit stop means for limiting rotation of said torque arm means to a second angular amount when said device is triggered.

8. The combination of claim 7 wherein said second angular amount is substantially 90°.

9. The combination of claim 1 wherein said latch means comprises a pair of arm members laterally spaced along said second axis, a bearing shaft carrying said first and second bearing means adjacent one end of said arm members, and a first pivot shaft extending along said second axis for pivotally mounting said arm members at the remaining end thereof.

10. The combination of claim 1 wherein said trigger arm means includes a free end having a ball weight seat portion with a predetermined contour, and wherein said trigger means comprises a ball weight supported by said seat portion and adapted to be dislodged therefrom in response to said seismic vibrations.

11. The combination of claim 10 wherein said predetermined contour is substantially conical.

12. The combination of claim 11 wherein the half apex angle of said conical contour is in the range from about 60° to less than 90°.

13. The combination of claim 10 wherein said housing comprises a pair of symmetric half portions provided with facing internal wall portions and providing a chamber for retaining said ball weight when said half portions are fitted together, said chamber including a floor portion with an aperture therein dimensioned to permit said ball weight seat portion to pass into said chamber from below and hold said ball weight in an elevated position above said floor portion when said device is armed.

14. The combination of claim 13 wherein said chamber floor portion slopes downwardly toward said aperture to promote migration of said bal weight towards said aperture when said ball weight is dislodged from said seat portion.

15. The combination of claim 1 wherein said torque arm means includes a first end portion extending along said first axis and terminating exteriorily of said housing for enabling said device to be reset manually by rotation of said torque arm means in the counterdirection to said predetermined angular direction.

16. The combination of claim 1 further including switch means coupled to said housing and having blade means engageable with said torque arm means when the latter is rotated in said predetermined angular direction by a predetermined amount to operate said switch means.

17. The combination of claim 1 further including an independently operable actuating means for said triggerable catch means.

18. The combination of claim 17 wherein said independently operable actuating means comprises an electrically operable solenoid means coupled to said housing, and link means coupled to said solenoid means and said trigger arm means for rotating said trigger arm means about said third axis in response to receipt of a control signal by said solenoid means.

19. The combination of claim 17 wherein said independently operable actuating means comprises a temperature sensitive switch element coupled to said housing and having movable link means for rotating said trigger arm means about said third axis in response to temperature changes of predetermined magnitude.

20. The combination of claim 1 wherein said trigger arm means includes a free end; and wherein said trigger means comprises a mass connected to said free end to provide a triggering threshold.

21. The combination of claim 1 wherein said trigger arm means includes a free end; and wherein said trigger means comprises spring means for applying a downwardly directed biassing force to said free end to provide a triggering threshold.

* * * * *